US012720440B2

(12) United States Patent
Deghel et al.

(10) Patent No.: US 12,720,440 B2
(45) Date of Patent: Aug. 25, 2026

(54) UPLINK TRANSMIT POWER CONTROL

(71) Applicant: Nokia Technologies Oy, Espoo (FI)

(72) Inventors: Matha Deghel, Massy (FR); Sami-Jukka Hakola, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 285 days.

(21) Appl. No.: 18/706,999

(22) PCT Filed: Oct. 31, 2022

(86) PCT No.: PCT/EP2022/080322
§ 371 (c)(1),
(2) Date: May 2, 2024

(87) PCT Pub. No.: WO2023/083641
PCT Pub. Date: May 19, 2023

(65) Prior Publication Data

US 2025/0031151 A1 Jan. 23, 2025

(30) Foreign Application Priority Data

Nov. 12, 2021 (FI) ..................................... 20216163

(51) Int. Cl.
*H04W 52/18* (2009.01)
*H04W 52/14* (2009.01)
*H04W 72/23* (2023.01)

(52) U.S. Cl.
CPC ......... *H04W 52/146* (2013.01); *H04W 72/23* (2023.01)

(58) Field of Classification Search
CPC . H04W 52/146; H04W 72/23; H04W 52/262; H04W 52/04; H04W 52/32;
(Continued)

(56) References Cited

U.S. PATENT DOCUMENTS 11,438,847 B2 * 9/2022 Liu ........................ H04W 72/23
11,457,415 B2 * 9/2022 Park ...................... H04W 52/54
(Continued)

FOREIGN PATENT DOCUMENTS

WO 2021/147933 A1 7/2021
WO 2021/194218 A1 9/2021
(Continued)

OTHER PUBLICATIONS

"3rd Generation Partnership Project, Technical Specification Group Radio Access Network; NR; Physical layer procedures for control (Release 16)", 3GPP TS 38.213, V16.7.0, Sep. 2021, pp. 1-188.
(Continued)

*Primary Examiner* — Andrew Wendell
(74) *Attorney, Agent, or Firm* — Barta Jones, PLLC

(57) ABSTRACT

This document discloses a solution for uplink transmit power control. According to an aspect, a method in a terminal device comprises: supporting at least first and second transmit power control parameter sets that are configured by an access node for uplink transmissions from the terminal device, wherein the first transmit power control parameter set is different from the second transmit power control parameter set; and receiving, from the access node, a message comprising downlink control information that schedules an uplink transmission from the terminal device, receiving an information element indicating a transmit power control parameter set of the at least first and second transmit power control parameter sets to be used for the uplink transmission from the terminal device.

20 Claims, 8 Drawing Sheets

(58) Field of Classification Search
CPC . H04W 52/34; H04W 52/0212; H04W 52/18; H04W 52/242
See application file for complete search history.

(56) References Cited

U.S. PATENT DOCUMENTS

| | | | | |
|---|---|---|---|---|
| 11,792,739 | B2 * | 10/2023 | MolavianJazi | H04W 52/42 455/522 |
| 2019/0223181 | A1 * | 7/2019 | Sun | H04W 52/325 |
| 2021/0184809 | A1 * | 6/2021 | Zhou | H04B 7/0617 |
| 2021/0211988 | A1 * | 7/2021 | Jung | H04W 52/386 |
| 2021/0289446 | A1 * | 9/2021 | Davydov | H04W 52/146 |
| 2022/0159683 | A1 * | 5/2022 | Islam | H04W 72/1268 |
| 2022/0312413 | A1 * | 9/2022 | Cozzo | H04L 1/0003 |
| 2023/0128306 | A1 * | 4/2023 | Khoshnevisan | H04L 5/0094 455/522 |
| 2023/0199827 | A1 * | 6/2023 | Xu | H04L 1/1854 370/329 |
| 2023/0209538 | A1 * | 6/2023 | Cirik | H04W 72/231 370/329 |
| 2023/0403121 | A1 * | 12/2023 | Zhang | H04L 5/0094 |

FOREIGN PATENT DOCUMENTS

| | | | |
|---|---|---|---|
| WO | 2021/208086 | A1 | 10/2021 |
| WO | 2021/212334 | A1 | 10/2021 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

"3rd Generation Partnership Project; Technical Specification Group Radio Access Network; NR; Medium Access Control (MAC) protocol specification (Release 16)", 3GPP TS 38.321, V16.6.0, Sep. 2021, pp. 1-158.

"3rd Generation Partnership Project; Technical Specification Group Radio Access Network; NR; Multiplexing and channel coding (Release 16)", 3GPP TS 38.212, V16.7.0, Sep. 2021, pp. 1-153.

"Revised WID: Further enhancements on MIMO for NR", 3GPP TSG RAN Meeting #92e, RP-211586, Agenda: 9.7.1.1, Samsung, Jun. 14-18, 2021, 6 pages.

"Enhancements on Multi-beam Operation", 3GPP TSG RAN WG1 #107-e, R1-2112176, Agenda: 8.1.1, Nokia, Nov. 11-19, 2021, 13 pages.

Office action received for corresponding Finnish Patent Application No. 20216163, dated Mar. 2, 2022, 11 pages.

"Summary #1 of Multi-TRP PUCCH and PUSCH Enhancements", 3GPP TSG RAN WG1 #105-e, R1-2106073, Agenda: 8.1.2.1, Nokia, May 19-27, 2021, 81 pages.

Office action received for corresponding Finnish Patent Application No. 20216163, dated Oct. 27, 2022, 10 pages.

International Search Report and Written Opinion received for corresponding Patent Cooperation Treaty Application No. PCT/EP2022/080322, dated Feb. 9, 2023, 11 pages.

Office action received for corresponding European Patent Application No. 22809833.1, dated Apr. 25, 2025, 7 pages.

Office action received for corresponding European Patent Application No. 22809833.1, dated Feb. 9, 2026, 5 pages.

* cited by examiner

PRE-ASSUMPTION: ENABLED TCI STATE IS ASSOCIATED WITH TWO TPC PARAMETER SETS

UPLINK TRANSMIT POWER CONTROL

RELATED APPLICATION

This application claims priority to PCT Application No. PCT/EP2022/080322, filed on Oct. 31, 2022, which claims priority to FI application No. 20216163, filed on Nov. 12, 2021, each of which is incorporated herein by reference in its entirety.

FIELD

Various embodiments described herein relate to the field of wireless communications and, particularly, to a uplink transmit power control in a cellular communication system.

BACKGROUND

In a cellular communication system, a terminal device (user equipment, UE) may be configured with one or multiple monitoring occasions within a time slot duration for monitoring a physical downlink control channel (PDCCH) in order to detect and extract downlink control information (DCI) addressed to the terminal device. The DCI carries, for example, paging information, transmit power control information, and/or scheduling information indicating uplink or downlink resources scheduled to the terminal device for data transmission or reception. Improvements to the transmit power control are needed.

BRIEF DESCRIPTION

Some aspects of the disclosure are defined by the independent claims.

Some embodiments of the disclosure are defined in the dependent claims.

The embodiments and features, if any, described in this specification that do not fall under the scope of the independent claims are to be interpreted as examples useful for understanding various embodiments of the disclosure. Some aspects of the disclosure are defined by the independent claims.

According to an aspect, there is provided an apparatus comprising at least one processor; and at least one memory including computer program code, wherein the at least one memory and computer program code are configured to, with the at least one processor, cause the apparatus to perform: supporting at least first and second transmit power control parameter sets that are configured by an access node for uplink transmissions from the apparatus, wherein the first transmit power control parameter set is different from the second transmit power control parameter set; and receiving, from the access node, at least one message comprising downlink control information that schedules an uplink transmission from the apparatus; receiving an information element indicating a transmit power control parameter set of the at least first and second transmit power control parameter sets to be used for the uplink transmission from the apparatus.

In an embodiment, the at least one memory and computer program code are configured to, with the at least one processor, cause the apparatus to: if the information element is with a first value, using the first transmit power control parameter set for the uplink transmission from the apparatus, and if the information element is with a second value which is different from the first value, using the second transmit power control parameter set for the uplink transmission from the apparatus.

In an embodiment, the first transmit power control parameter set is configured for a first transmission mode and the second transmit power control parameter set is configured for a second transmission mode.

In an embodiment, the first transmit power control parameter set is associated with a first transmission configuration indicator state in a set of transmission configuration indicator states, wherein the downlink control information further indicates one transmission configuration indicator state of the set of transmission configuration indicator states for the uplink transmission from the apparatus, and wherein the at least one memory and computer program code are configured to, with the at least one processor, cause the apparatus to: if the information element is with the first value and the downlink control information indicates the first transmission configuration indicator state, select the first transmit power control parameter set; and if the information element is with the second value and the downlink control information indicates the first transmission configuration indicator state, select the second transmit power control parameter set not associated with the first transmission configuration indicator state.

In an embodiment, the at least one memory and computer program code are configured to, with the at least one processor, cause the apparatus to: if the information element is with the first value and the downlink control information indicates a second transmission configuration indicator state not associated with a transmit power control parameter set, select from the at least first and second transmit power control parameter sets, a transmit power control parameter set associated with a value of a sounding reference signal resource indicator in the received downlink control information.

In an embodiment, the at least one memory and computer program code are configured to, with the at least one processor, cause the apparatus to: if the information element is with the first value and the downlink control information indicates a second transmission configuration indicator state not associated with a transmit power control parameter set, select from the at least first and second transmit power control parameter sets, a transmit power control parameter set configured for the uplink transmission on a layer higher than a medium access control layer.

In an embodiment, the at least one memory and computer program code are configured to, with the at least one processor, cause the apparatus to: if the information element is with a third value, select from the at least first and second transmit power control parameter sets, a transmit power control parameter set associated with a value of a sounding reference signal resource indicator in the received downlink control information.

In an embodiment, both the first and second transmit power control parameter sets are associated with the same transmission configuration indicator state in a set of transmission configuration indicator states, wherein the downlink control information further indicates the transmission configuration indicator state.

In an embodiment, the information element is comprised in a message of a radio resource control configuration, and wherein the first value indicates that a medium access control layer is enabled to update a path loss reference signal configuration, and wherein the second value indicates that the medium access control layer is disabled to update the path loss reference signal configuration.

According to an aspect, there is provided an apparatus comprising at least one processor; and at least one memory including computer program code, wherein the at least one memory and computer program code configured to, with the at least one processor, cause the apparatus to perform: providing a terminal device with at least first and second transmit power control parameter sets for uplink transmission from the terminal device, wherein the first transmit power control parameter set is different from the second transmit power control parameter set; causing transmission of at least one message to the terminal device, the at least one message comprising downlink control information that schedules an uplink transmission from the terminal device, wherein the downlink control information comprises an information element indicating a transmit power control parameter set of the at least first and second transmit power control parameter sets, wherein a first value of the information element indicates the terminal device to use the first transmit power control parameter set for the uplink transmission from the terminal device, and wherein a second value of the information element indicates the terminal device to use the second transmit power control parameter set for the uplink transmission from the terminal device.

According to an aspect, there is provided a method comprising: supporting, by a terminal device, at least first and second transmit power control parameter sets that are configured by an access node for uplink transmissions from the terminal device, wherein the first transmit power control parameter set is different from the second transmit power control parameter set; and receiving, by the terminal device from the access node, at least one message comprising downlink control information that schedules an uplink transmission from the terminal device, receiving, by the terminal device, an information element indicating a transmit power control parameter set of the at least first and second transmit power control parameter sets to be used for the uplink transmission from the terminal device.

In an embodiment, the terminal device performs: if the information element is with a first value, using the first transmit power control parameter set for the uplink transmission from the apparatus, and if the information element is with a second value which is different from the first value, using the second transmit power control parameter set for the uplink transmission from the apparatus.

In an embodiment, the first transmit power control parameter set is configured for a first transmission mode and the second transmit power control parameter set is configured for a second transmission mode.

In an embodiment, the first transmit power control parameter set is associated with a first transmission configuration indicator state in a set of transmission configuration indicator states, wherein the downlink control information further indicates one transmission configuration indicator state of the set of transmission configuration indicator states for the uplink transmission from the apparatus, and wherein the terminal device performs: if the information element is with the first value and the downlink control information indicates the first transmission configuration indicator state, select the first transmit power control parameter set; and if the information element is with the second value and the downlink control information indicates the first transmission configuration indicator state, select the second transmit power control parameter set not associated with the first transmission configuration indicator state.

In an embodiment, the terminal device performs: if the information element is with the first value and the downlink control information indicates a second transmission configuration indicator state not associated with a transmit power control parameter set, select from the at least first and second transmit power control parameter sets, a transmit power control parameter set associated with a value of a sounding reference signal resource indicator in the received downlink control information.

In an embodiment, the terminal device performs: if the information element is with the first value and the downlink control information indicates a second transmission configuration indicator state not associated with a transmit power control parameter set, select from the at least first and second transmit power control parameter sets, a transmit power control parameter set configured for the uplink transmission on a layer higher than a medium access control layer.

In an embodiment, the terminal device performs: if the information element is with a third value, select from the at least first and second transmit power control parameter sets, a transmit power control parameter set associated with a value of a sounding reference signal resource indicator in the received downlink control information.

In an embodiment, both the first and second transmit power control parameter sets are associated with the same transmission configuration indicator state in a set of transmission configuration indicator states, wherein the downlink control information further indicates the transmission configuration indicator state.

In an embodiment, the information element is comprised in a message of a radio resource control configuration, and wherein the first value indicates that a medium access control layer is enabled to update a path loss reference signal configuration, and wherein the second value indicates that the medium access control layer is disabled to update the path loss reference signal configuration.

According to an aspect, there is provided a method comprising: providing a terminal device with at least first and second transmit power control parameter sets for uplink transmission from the terminal device, wherein the first transmit power control parameter set is different from the second transmit power control parameter set; causing transmission of at least one message to the terminal device, the at least one message comprising downlink control information that schedules an uplink transmission from the terminal device, wherein the downlink control information comprises an information element indicating a transmit power control parameter set of the at least first and second transmit power control parameter sets, wherein a first value of the information element indicates the terminal device to use the first transmit power control parameter set for the uplink transmission from the terminal device, and wherein a second value of the information element indicates the terminal device to use the second transmit power control parameter set for the uplink transmission from the terminal device.

According to an aspect, there is provided a computer program product embodied on a computer-readable medium and comprising a computer program code readable by a computer, wherein the computer program code configures the computer to carry out a computer process comprising: supporting at least first and second transmit power control parameter sets that are configured by an access node for uplink transmissions from the terminal device, wherein the first transmit power control parameter set is different from the second transmit power control parameter set; and receiving, from the access node, at least one message comprising downlink control information that schedules an uplink transmission from the terminal device, receiving an information element indicating a transmit power control parameter set of the at least first and second transmit power control parameter sets to be used for the uplink transmission from the terminal device.

According to an aspect, there is provided a computer program product embodied on a computer-readable medium and comprising a computer program code readable by a computer, wherein the computer program code configures the computer to carry out a computer process comprising: providing a terminal device with at least first and second transmit power control parameter sets for uplink transmission from the terminal device, wherein the first transmit power control parameter set is different from the second transmit power control parameter set; causing transmission of at least one message to the terminal device, the at least one message comprising downlink control information that schedules an uplink transmission from the terminal device, wherein the downlink control information comprises an information element indicating a transmit power control parameter set of the at least first and second transmit power control parameter sets, wherein a first value of the information element indicates the terminal device to use the first transmit power control parameter set for the uplink transmission from the terminal device, and wherein a second value of the information element indicates the terminal device to use the second transmit power control parameter set for the uplink transmission from the terminal device.

LIST OF DRAWINGS

Embodiments are described below, by way of example only, with reference to the accompanying drawings, in which FIG. 1 illustrates a wireless communication scenario to which some embodiments may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the substantially same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figures 1, 2:
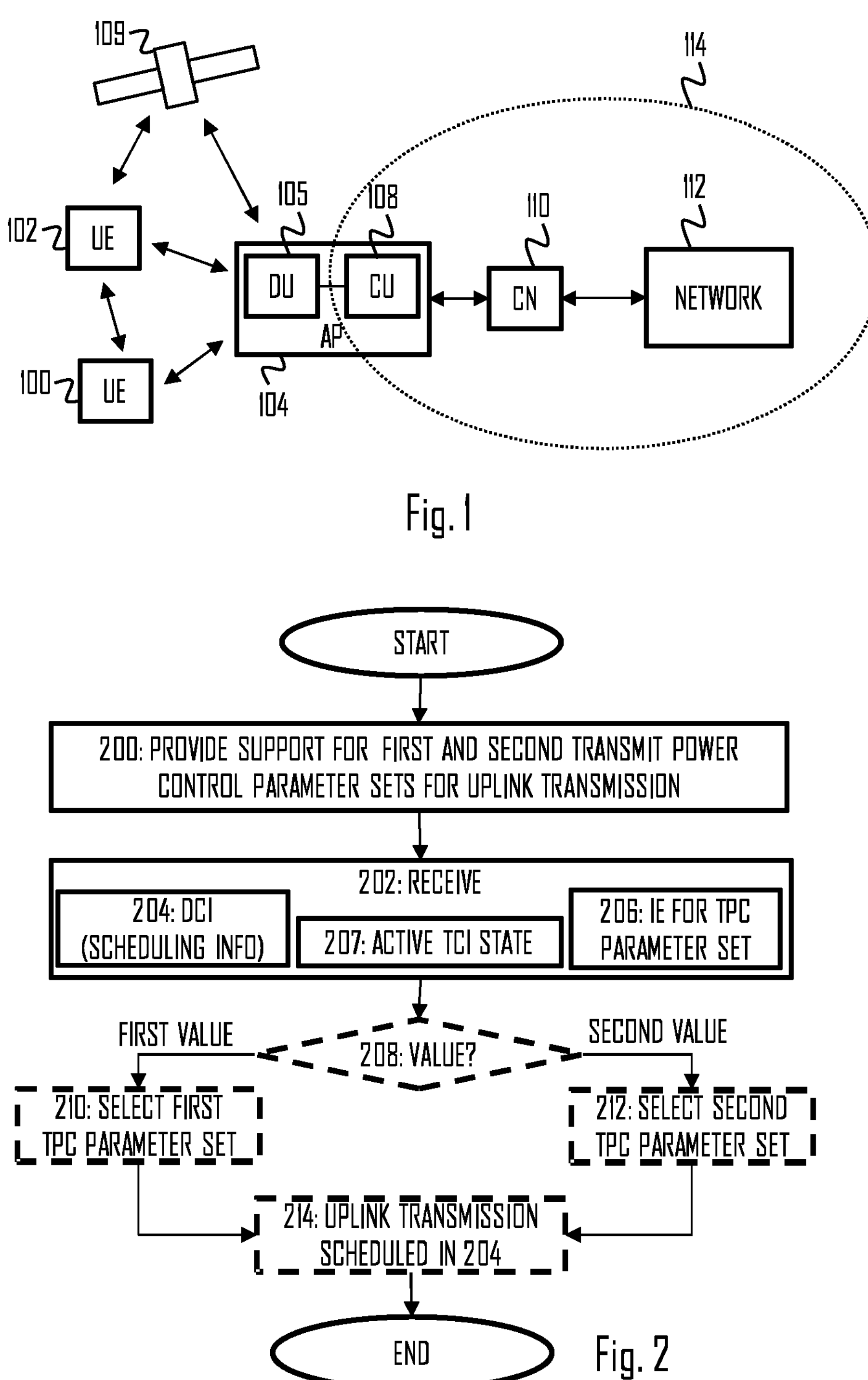
FIGS. 2 and 3 illustrate embodiments of processes for carrying out uplink transmit power control.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the substantially same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC)), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave-sub-THz). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

A downlink control channel such as the physical downlink control channel (PDCCH) mentioned in Background may carry downlink control information (DCI) for a terminal device. As described in Background, the downlink control information DCI may indicate a beam selection for the terminal device amongst a set of multiple beams available. The multiple beams may be for a single access node or for multiple access nodes in a multi-cell scenario where the terminal device is capable of communicating with multiple access nodes within the substantially same radio resource control (RRC) connection.

The terminal device can be configured into two different modes for physical uplink shared channel (PUSCH) multi-antenna precoding, namely codebook-based transmission and non-codebook-based transmission. For a codebook-based DG (dynamic grant) PUSCH, the UE determines SRI (sounding reference signal, SRS, resource indicator) and TPMI (transmit precoding matrix indicator) information (via precoding information and a number of layers) from the corresponding fields in the DCI. The SRI basically provides the uplink beam selection information, and TPMI provides uplink precoder information. The SRI thus indicates the beam or beams scheduled to the terminal device for uplink (data) transmission. For non-codebook-based DG PUSCH, in contrast to codebook-based mode, the terminal device determines its precoder and transmission rank based on downlink measurements. However, the selection of a precoder (and the number of layers) for at least one scheduled PUSCH may be modified by the access node (in a case where multiple SRS resources are configured), basically by omitting some columns from the precoder that the terminal device has selected. This latter step is done by indicating, via the SRI value contained in the DCI scheduling the PUSCH, a subset of the configured SRS resources.

The uplink (e.g. PUSCH) power control may be based on a combination of open-loop power control and closed-loop power control, as known in the art. In the open-loop power control, potentially including support for fractional path-loss compensation defined by parameter a in the specifications for 5G, the terminal device estimates the uplink path-loss based on downlink measurements and sets the transmit power accordingly. In the closed-loop power control, explicit power-control (TPC) commands are provided by the access node.

The terminal device may determine the uplink transmission power based on the closed-loop parameters (e.g. a closed-loop index, a transmit power control command) and open-loop parameters (pathloss reference RS (reference signal), p0 parameter describing a target reception power at the access node, alpha defining a pathloss compensation factor). The TPC command may be carried in the DCI that schedules the PUSCH transmission. Also, the TPC command (and the corresponding closed-loop index) can be carried jointly to multiple terminal devices by means of group-common DCI using DCI format 2-2 of the 3GPP specifications for 5G.

Hence, the main power control parameters that the PUSCH transmission power depends on are:

closed-loop index (also known as power control adjustment state),

TPC command (absolute or accumulative TPC command), pathloss reference RS (reference signal), p0 (target reception power at the access node, also denoted as P0_UE_PUSCH), alpha (for partial of full path-loss compensation).

Further, a DCI field for open-loop power control parameter set indication has been defined in the 3GPP specifications for 5G. This indication may indicate to the terminal device, whether to use p0 associated with eMBB (enhanced mobile broadband) services or some boosted p0 associated with URLLC (ultra-reliable low-latency communication) services.

A beam configured to transmit the DCI may be indicated via a separate medium access control (MAC) control command that carries a transmission configuration indication (TCI) state indicating one or more reference signals of the transmitting cell, as known in the art. A set of TCI states may be configured via radio resource control (RRC) signaling, wherein the some of the TCI states may be dedicated to a single terminal device while some of the TCI states may be common to multiple terminal devices. The MAC layer may then enable a number of these configured TCI states, i.e. these TCI states become active (from MAC perspective), and a TCI state may be activated for uplink transmission via DCI signaling. This activated TCI state which is indicated via DCI may also refer to indicated (UL) TCI state, indicated active (UL) TCI state, and/or current applicable (UL) TCI state. On the unified TCI framework, the following aspects have been specified:

- Common TCI state (a.k.a. indicated TCI) for a set of signals and channels at a time.
- TCI state can be joint for downlink and uplink or TCI states may be separate for uplink and downlink.
- RRC layer configures a set (or a pool) of joint and/or separate active TCI states.
- MAC layer enables a number (e.g. 8) of joint and/or separate TCI states.
- Before the first indication, e.g. first scheduling, the first enabled (or active) TCI state is the currently indicated (active) TCI state
- DCI indicates one of the enabled TCI states to be indicated TCI state (which may be a joint/common TCI state).

On the DCI-based TCI state indication, the following has been specified:

- DCI format 1_1/1_2 with and without downlink assignment is used to carry the TCI state indication.
- Indication confirmed by the terminal device via hybrid automatic repeat request (HARQ) acknowledgment (ACK).
- Application time of the beam indication:
- the first slot that is at least X ms or Y symbols after the last symbol of the acknowledgment of the joint or separate DL/UL beam indication
- TCI field codepoint:
  - Joint:
    - TCI state for both downlink and uplink;
  - Separate:
    - a pair of a downlink TCI state and an uplink TCI state;
    - a downlink TCI state (keep the current uplink TCI state)
    - an uplink TCI state (keep the current downlink TCI state)

Figure 3:
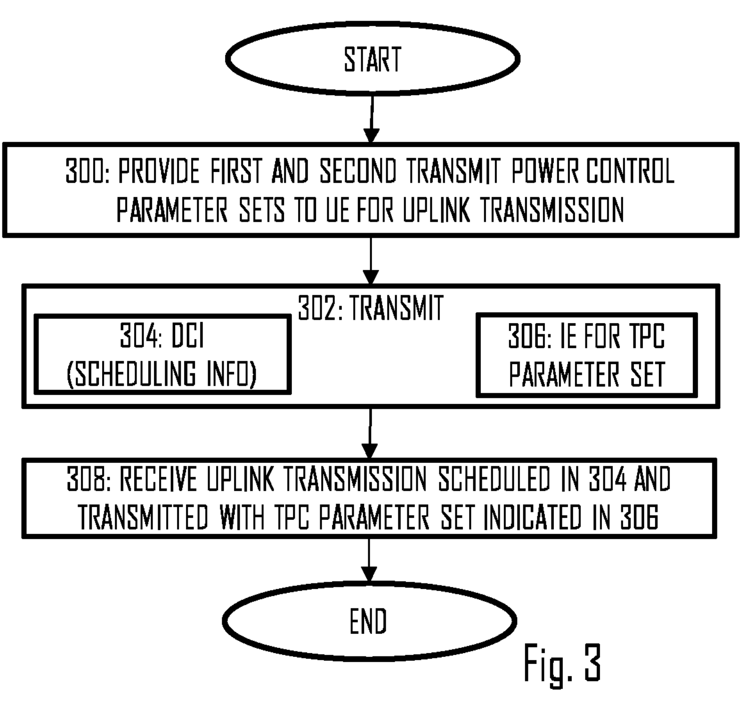

FIGS. 2 and 3 illustrates embodiment for controlling uplink transmit power of a terminal device 100, 102. FIG. 2 illustrates a procedure for the terminal device 100, 102, while FIG. 3 illustrates a procedure for an access node 104. The access node may control a cell serving the terminal device with a radio resource control (RRC) connection.

Referring to FIG. 2, the process in an apparatus for the terminal device comprises: supporting (block 200) at least first and second transmit power control parameter sets that are configured by a network device for uplink transmissions from the apparatus, wherein the first transmit power control parameter set is different from the second transmit power control parameter set; and receiving (block 202) from the network device, at least one message comprising downlink control information 204 that schedules an uplink transmission from the apparatus, wherein the downlink control information comprised in the at least one message or downlink control information received from the access node in general (e.g. in another message) comprises an information element 206 indicating a transmit power control parameter set of the at least first and second transmit power control parameter sets to be used for the uplink transmission from the apparatus.

The transmit power control parameter set(s) may include any one or a subset or all the above-described transmit power control parameters. The transmit power control parameter set(s) may include at least open-loop and/or closed-loop transmit power control parameters.

The terminal device may have multiple concurrently configured TPC parameter sets or TPC parameter configurations that it can dynamically select for at least one scheduled uplink transmission, as described in the embodiments below.

Further referring to FIG. 2, blocks 208 to 214 may be carried out in an embodiment. If the information element is determined to be with a first value in block 208, the terminal device uses (block 210) the first transmit power control parameter set for the uplink transmission in block 214. If the information element is determined to be with a second value which is different from the first value in block 208, the terminal device uses (block 212) the second transmit power control parameter set for the uplink transmission in block 214.

The downlink control information received in block 202 may further include an indication of an active TCI state (207) activated for the scheduled uplink transmission. As described herein, the active TCI state may be indicated in the same message that delivers the scheduling information 204 or in another message, as indicated by 207. The active TCI state may be used by the terminal device to determine the TPC parameter set for the uplink transmission, e.g. under the control of the information element of block 206.

Referring to FIG. 3, a procedure in an apparatus for the access node 104 comprises: providing (block 300) a terminal device with at least first and second transmit power control parameter sets for uplink transmission from the terminal device, wherein the first transmit power control parameter set is different from the second transmit power control parameter set; causing (block 302) transmission of at least one message to the terminal device, the at least one message comprising downlink control information 304 that schedules an uplink transmission from the terminal device, and an information element 306 indicating a transmit power control parameter set of the at least first and second transmit power control parameter sets, wherein a first value of the information element indicates the terminal device to use the first transmit power control parameter set for the uplink transmission from the terminal device, and wherein a second value of the information element indicates the terminal device to use the second transmit power control parameter set for the uplink transmission from the terminal device. In block 308, the access node receives the uplink transmission scheduled in block 304 from the terminal device, wherein the uplink transmission has been transmitted in accordance with the information element transmitted in block 306.

The embodiments of FIG. 2 enable a solution to signal one of multiple (enabled) TPC (transmit power control) parameter sets that shall be applied to the uplink transmission. The multiple TPC parameter sets may be for different types of transmissions, e.g. for different service categories or traffic classes. In an embodiment the first transmit power control parameter set is configured for a high-throughput transmission mode (a first transmission mode) and the second transmit power control parameter set is configured for a low-latency transmission mode (a second transmission mode). An example of the high-throughput transmission mode is an enhanced mobile broadband (eMBB) mode of the 3GPP specifications for 5G, while an example of the low-latency transmission mode is an ultra-reliable low-latency communication (URLLC) mode of the 3GPP specifications for 5G.

Let us then describe some embodiments of the procedures of FIGS. 2 and 3. As described above, the terminal device may be configured with two (or more) sets of TPC parameters, where each set may correspond/provide at least one value for one or more TPC parameters, e.g. p0, α, the closed-loop index, and/or a path loss reference signal (PL-RS) configuration. A TCI state (be it separate UL TCI state or joint TCI state) may be optionally associated with (or including) one or more of the TPC parameter sets for the uplink (PUSCH) transmission. In some embodiments, a SRS resource indicator (SRI) may be associated with one of the configured TPC parameter sets, e.g. via SRI-PUSCH-PowerControl signalling.

DCI indicating the active TCI state (or the 'indicated TCI state') may be comprised in the message scheduling the uplink transmission (blocks 202 and 204) to the terminal device. Alternatively, or additionally, the DCI indicating the active TCI state for the uplink transmission may be comprised in another message.

Embodiments described below provide several different, alternative TPC parameter sets that may be configured to the terminal device. One of the TPC parameter sets may be configured on a protocol layer higher than a medium access control (MAC) layer. Accordingly, its configuration may be more static than TPC parameter set(s) configured on the MAC layer. The higher layer may be the RRC layer. One or more of the TPC parameter sets may be configured such that they are associated with one or more TCI states (enabled) for the terminal device (on the MAC layer), or more generally, associated with one or more configured TCI states (via RRC) for the terminal device. As described above, multiple TCI states may be enabled on the MAC layer (or even via RRC) and a subset of them (e.g. one) may be activated/indicated by the DCI at a time. If the activated/indicated TCI state is associated with the TPC parameter set in the configuration, the terminal device may adopt the TPC parameters associated with the activated/indicated TCI state. Yet another embodiment is to indicate the TPC parameter set via a value of the SRI provided on the MAC layer in the DCI. If the SRI field has a certain value, it may cause the terminal device to apply the TPC parameter set mapped to the SRI field value. In all embodiments the TPC parameters listed above or a subset thereof (e.g. only the parameter p0) may be determined adaptively amongst the available TPC parameter sets configured to the terminal device (e.g. via RRC). In other words, the multiple TPC parameter sets may be configured on the RRC layer, and one of them may be enabled on the RRC layer or on the MAC layer, depending on the embodiment described below.

Figure 4:
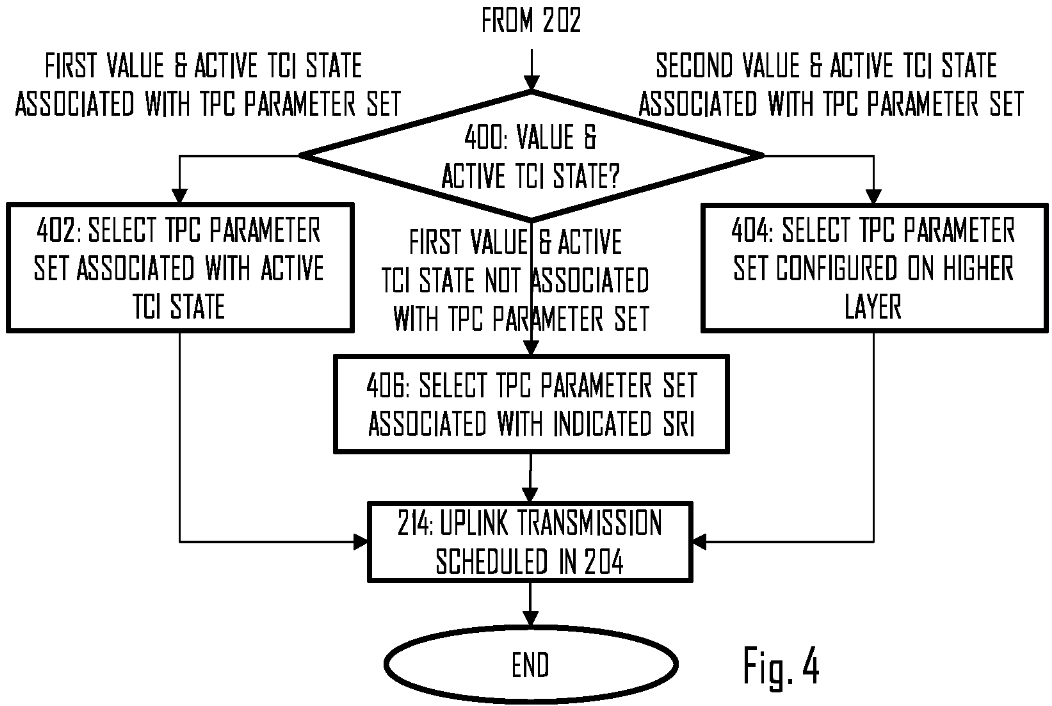
FIGS. 4 and 5 illustrate embodiments where a transmit power control parameter set is associated with a transmission configuration indicator state.
Figure 5:
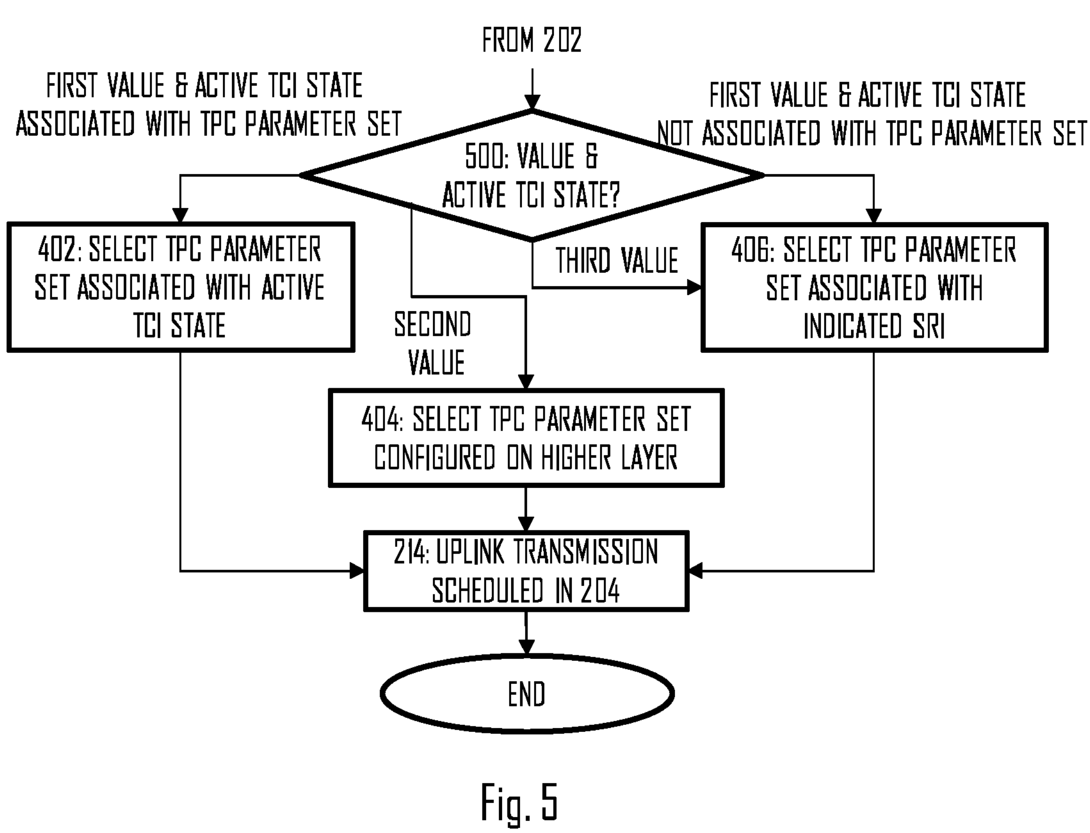
Figure 6:
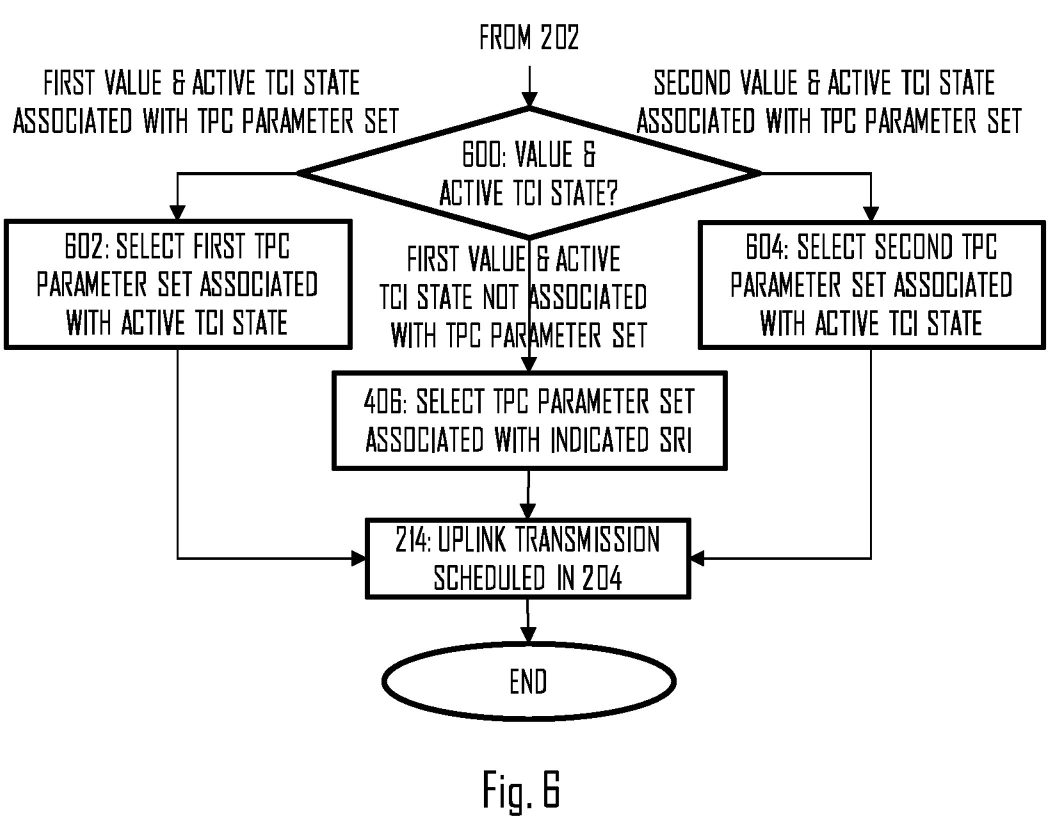
FIGS. 6 and 7 illustrate embodiments where multiple transmit power control parameter sets are associated with a transmission configuration indicator state.
Figure 7:
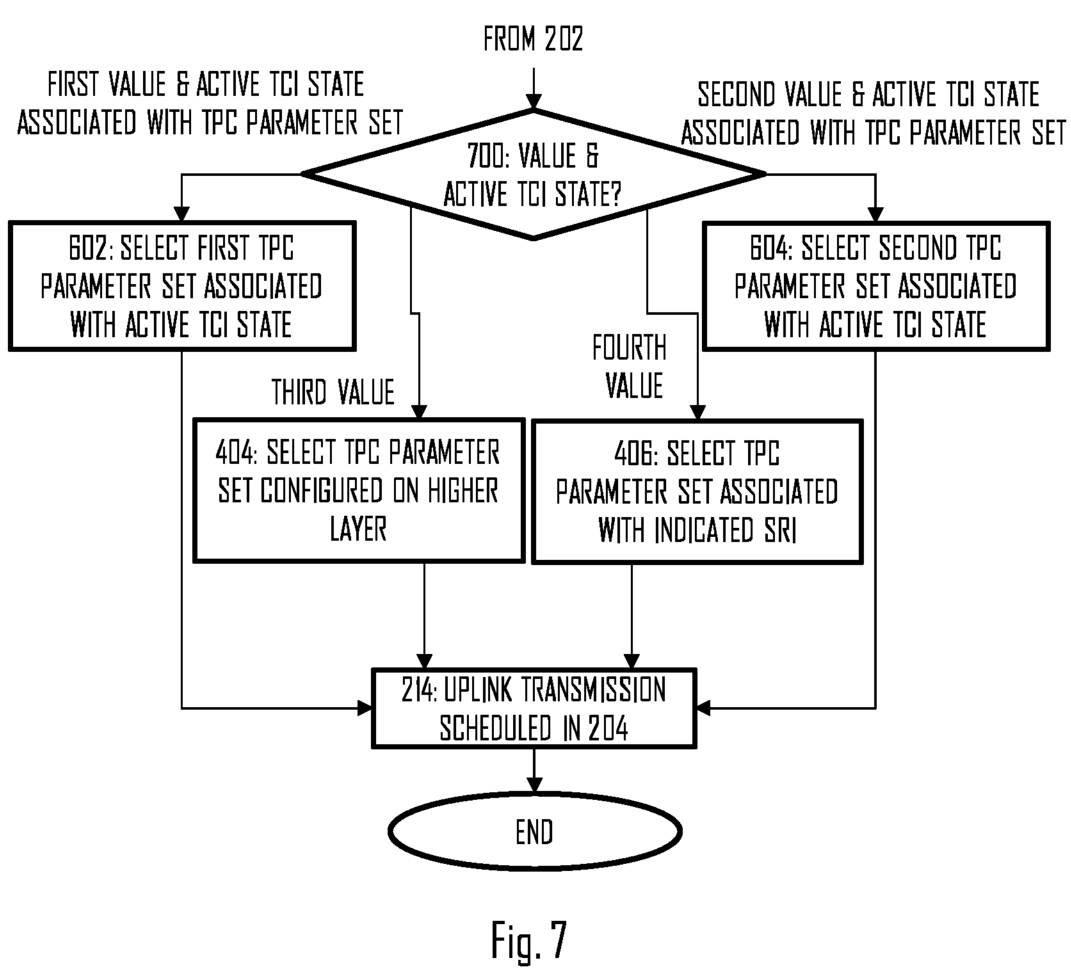

FIGS. 4 and 5 illustrate embodiments where a TCI state (e.g. an enabled TCI state) is associated with only one TPC parameter set, while FIGS. 6 and 7 illustrate embodiments where multiple TPC parameter sets are associated with the TCI state (e.g. an enabled TCI state). FIGS. 4 and 6 illustrate embodiments where the information element of blocks 206 and 306 is a one-bit indicator, while FIGS. 5 and 7 illustrate embodiments where the information element of blocks 206 and 306 is a two-bit indicator.

Referring to FIG. 4, let us describe an embodiment where the terminal device selects the TPC parameter set for the uplink transmission amongst at least some of the above-described TPC parameter set options. In the embodiment of FIG. 4, the first transmit power control parameter set is associated with a first transmission configuration indicator (TCI) state in a set of TCI states enabled for the terminal device. The DCI of block 204/304 may or may not further indicate one (active) TCI state of the set of enabled TCI states for the uplink transmission. Now, the process of FIG. 4 is carried out after block 202 of FIG. 2. In block 400, the terminal device determines the value of the information element and the active TCI state indicated in the DCI of block 204 or DCI in another message 207. If the information element is with a first value, the terminal device selects the first transmit power control parameter set (block 402). In other words, if the information element is indicating a first value/entry e.g. '0', the terminal device may use the TPC parameter set associated with the indicated uplink or joint TCI state (or currently applicable uplink TCI state for the uplink transmission) to determine (the value of) at least one of the PUSCH TPC parameters (such as p0).

If the information element is with a second value, the terminal device selects the second transmit power control parameter set not associated with the first indicated (active) TCI state (block 404). The second TPC parameter set may have been configured on the higher protocol layer, e.g. on the RRC. In other words, if the information element is indicating the second value e.g. '1', the terminal device may use a TPC parameter set not associated with the indicated (active) uplink or joint TCI state (or currently applicable uplink TCI state) to determine (the value of) at least one of the PUSCH power control parameters (such as p0).

As yet a further option in the embodiment of FIG. 4, if the information element is with the first value and the indicated (active) TCI state is not associated with a transmit power control parameter set, the terminal device selects (block 406) a transmit power control parameter set associated with a value of the SRI in the received DCI. In other words, if the indicated (active) uplink/joint TCI state is not associated with (or doesn't include) a TPC parameter set, the terminal device may use the TPC parameter set associated with the indicated/applicable SRI to determine at least one of the PUSCH power control parameters.

In the embodiments of FIG. 4, the DCI field provides the indication of the TPC parameter set that is configured/present in the DCI scheduling the uplink PUSCH transmission, and the indication is a one-bit indication, and the DCI scheduling the PUSCH either contains an SRI field (for block 406) or does not contain an SRI field (for blocks 402 and 404).

The embodiment of FIG. 5 is a modified version of the embodiment of FIG. 4 that exploits the benefit of further states (values) of the information element indicating the TPC parameter set to be applied to the uplink transmission in block 214. In FIG. 5, the same reference numbers refer to the same or substantially similar functions as in FIGS. 2 and 4. Referring to FIG. 5, the terminal device determines in block 500 the value of the information element received in block 206 and the active TCI state indicated in the DCI in block 204 or in block 207.

If the information element has a first value and the indicated (active) TCI state is associated with a TPC parameter set (in the RRC configuration), the terminal device may carry out block 402 and select the TPC parameter set associated with the indicated active TCI state. In other words, if the information element is indicating a first value/entry e.g. '00', the terminal device may use the TPC parameter set associated with the indicated (active) uplink or joint TCI state (or currently applicable uplink TCI state) to determine (the value of) at least one of the PUSCH power control parameters.

If the information element has the first value and the indicated (active) TCI state is not associated with a TPC parameter set (e.g. in the RRC configuration), the terminal device may carry out block 406 and select the TPC parameter set indicated by the value of the SRI field in the DCI. In other words, if the indicated (active) uplink/joint TCI state is not associated with (or does not include) a TPC parameter set, the terminal device may use the TPC parameter set associated with the indicated/applicable SRI to determine (the value of) at least one of the PUSCH power control parameters.

If the information element has a second value, the terminal device may carry out block 404 and select the TPC parameter set configured on the higher protocol layer, e.g. on the RRC layer. In other words, if the information element is indicating the second value different from the first value (e.g. '01'), the terminal device may use a TPC parameter set not associated with the indicated (active) uplink or joint TCI state (or current applicable uplink TCI state) to determine (the value of) at least one of the PUSCH power control parameters, e.g. the terminal device may use a TPC parameter set configured as a part of the PUSCH configuration on the RRC layer.

Alternatively, or additionally, if the information element has a third value, the terminal device may carry out block 406. In other words, if the information element is indicating the third value e.g. '11', the terminal device may use the TPC parameter set associated with the indicated/applicable SRI (if any) to determine (the value of) at least one of the PUSCH power control parameters. In other words, block 406 may be carried out via two different routes: implicitly via indicating the first value in the information element and the active TCI state associated with no TPC parameter set, or explicitly via the third value of the information element. One may be used when the active TCI state is not associated to power control parameter set, and the other one used to explicitly indicate the terminal device to use the TPC parameter set associated with SRI.

In the embodiments of FIG. 5, the DCI field may provide the indication of the TPC parameter set configured/present in the DCI scheduling the PUSCH, and it is a 2-bit indication, and (at least optionally) the DCI scheduling the PUSCH either contains the SRI field (for block 406) or does not contain the SRI field.

In an embodiment, both the first and second TPC parameter sets are associated with the same TCI state in the set of enabled transmission configuration indicator states, and the or a DCI further indicates the transmission configuration indicator state to be activated (i.e. the indicated (active) TCI state) for the uplink transmission of block 214. The value of the information element then indicates to the terminal device which one of the first and second TPC parameter sets to be applied to the uplink transmission. FIGS. 6 and 7 illustrate such embodiments.

Referring to FIG. 6, the process starts after block 202. In block 600, the terminal device determines the value of the information element and the active TCI state indicated in the DCI for the uplink transmission or in a separate DCI. If the information element has the first value and the DCI indicates an active TCI state that is associated with multiple TPC parameter sets (e.g. the first TPC parameter set and the second TPC parameter set), the terminal device selects the first TPC parameter set in block 602. In other words, if the information element is indicating a first value e.g. '0', the terminal device may use the first TPC parameter set associated with the indicated (active) uplink or joint TCI state (or current applicable uplink TCI state) to determine (the value of) at least one of the PUSCH power control parameters; the first TPC parameter set may be the set with a lower/higher index.

If the information element is with the first value but the indicated (active) TCI state (or the activated TCI state via DCI) is not associated with any TPC parameter set, the process may proceed to block 406 where the TPC parameter set associated with the value of the SRI in the received DCI is selected. In other words, if the indicated (active) uplink/joint TCI state is not associated with (or does not include) a TPC parameter set, the terminal device may use the TPC parameter set associated with the indicated/applicable SRI to determine at least one of the PUSCH power control parameters.

If the information element is with the second value and the indicated (active) TCI state is associated with multiple TPC parameter sets (e.g. the first TPC parameter set and the second TPC parameter set), the terminal device selects the second TPC parameter set in block 604. In other words, if the information element is indicating a second value e.g. '1', the terminal device may use the second TPC parameter set associated with the indicated (active) uplink or joint TCI state (or current applicable uplink TCI state) to determine (the value of) at least one of the PUSCH power control parameters; the second TPC parameter set may be the set with higher/lower index.

In the embodiment of FIG. 6, the DCI field that provides indication of the TPC parameter set is configured/present in the DCI scheduling the PUSCH, and it consists of 1-bit indication, and (at least optionally) if the uplink DCI scheduling the PUSCH either contains an SRI field (for block 406) or does not contain an SRI field.

FIG. 7 illustrates an embodiment where a TCI state (enabled or more generally, a configured TCI state) is associated with multiple TPC parameter sets in the RRC configuration, and where the information element has at least two bits. The blocks with the same reference numbers as in the other Figures represent the same or substantially similar functions.

Referring to FIG. 7, the process starts after block 202. In block 700, the terminal device determines the value of the information element and the active TCI state indicated in the DCI for the uplink transmission or in a separate DCI. If the information element has the first value and the indicated (active) TCI state is associated with multiple TPC parameter sets (e.g. the first TPC parameter set and the second TPC parameter set), the terminal device selects the first TPC parameter set in block 602. In other words, if the information element is indicating the first value e.g. '00', the terminal device may use the first TPC parameter set associated with the indicated (active) uplink or joint TCI state (or current applicable uplink TCI state) to determine (the value of) at least one of the PUSCH power control parameters; the first TPC parameter set may be the set with lower/higher index.

If the information element is with the second value and the indicated (active) TCI state is associated with multiple TPC parameter sets (e.g. the first TPC parameter set and the second TPC parameter set), the terminal device selects the second TPC parameter set in block 604. In other words, if the information element is indicating a second value e.g. '01', the terminal device may use the second TPC parameter set associated with the indicated (active) uplink or joint TCI state (or current applicable uplink TCI state) to determine (the value of) at least one of the PUSCH power control parameters; the second TPC parameter set may be the set with higher/lower index.

If the information element is with a third value, the terminal device may select in block 404 the TPC parameter set configured on the higher (RRC) protocol layer. In other words, if the information element is indicating a value different from the first and second values (e.g. indicating '10'), the UE may use a power control parameter set not associated with the indicated (active) uplink or joint TCI state (or current applicable uplink TCI state) to determine (the value of) at least one of the PUSCH power control parameters; e.g. the UE may use a power control parameter set configured as part of the higher layer PUSCH configuration.

Alternatively, or additionally, if the information element is indicating a fourth value, the process may proceed to block 406 where the TPC parameter set associated with the value of the SRI in the received DCI is selected. In other words, if the information element has the fourth value (e.g. '11'), the terminal device may use the TPC parameter set associated with the indicated/applicable SRI to determine at least one of the PUSCH power control parameters.

In the embodiment of FIG. 7, the DCI field provides the indication of the TPC parameter set configured/present in the DCI scheduling the PUSCH, and it has a two-bit indication, and (at least optionally) the DCI scheduling the PUSCH either contains an SRI field (for block 406) or doesn't contain an SRI field.

In an embodiment, the terminal device determines the TPC parameter set for the PUSCH as follows. First the terminal device may determine the SRS resource(s) specified for the uplink transmission in the DCI, for example. If the SRI field is present in DCI, the terminal device may determine the SRS resource(s) from the SRI indication. Otherwise there may be only one SRS resource (for codebook-based or non-codebook-based PUSCH transmission). Then, the terminal device may determine, e.g. from the received DCI, the active TCI state(s) of the determined SRS resource(s). Then, the terminal device may read from the DCI the value of the information element, e.g. the one-bit or two-bit indication, and determine based on the indication which one of the TPC parameter sets associated to the determined TCI state(s) is to be applied. In an embodiment, in a case where a value of the SRI field refers to two active TCI states (possible in a non-codebook based uplink transmission), the two-bit information element is interpreted so that the first bit is used to select the TPC parameter set of the first TCI state and the second bit is used to select the TPC parameter set of the second TCI state (assuming both active TCI states are associated with two power control parameter sets). Accordingly, the terminal device may select multiple TPC parameter sets for the uplink transmission. Then, the terminal device applies determined TPC parameter set(s) for the uplink transmission in block 214. Alternatively, or additionally, if the UE determines two (or more) TPC parameter sets, the UE may select one set among these sets, e.g. the UE may select the set corresponding to or resulting in the lower/higher transmit power (or the set with the lower/higher value of a given power control parameter such as P0).

Figure 8:
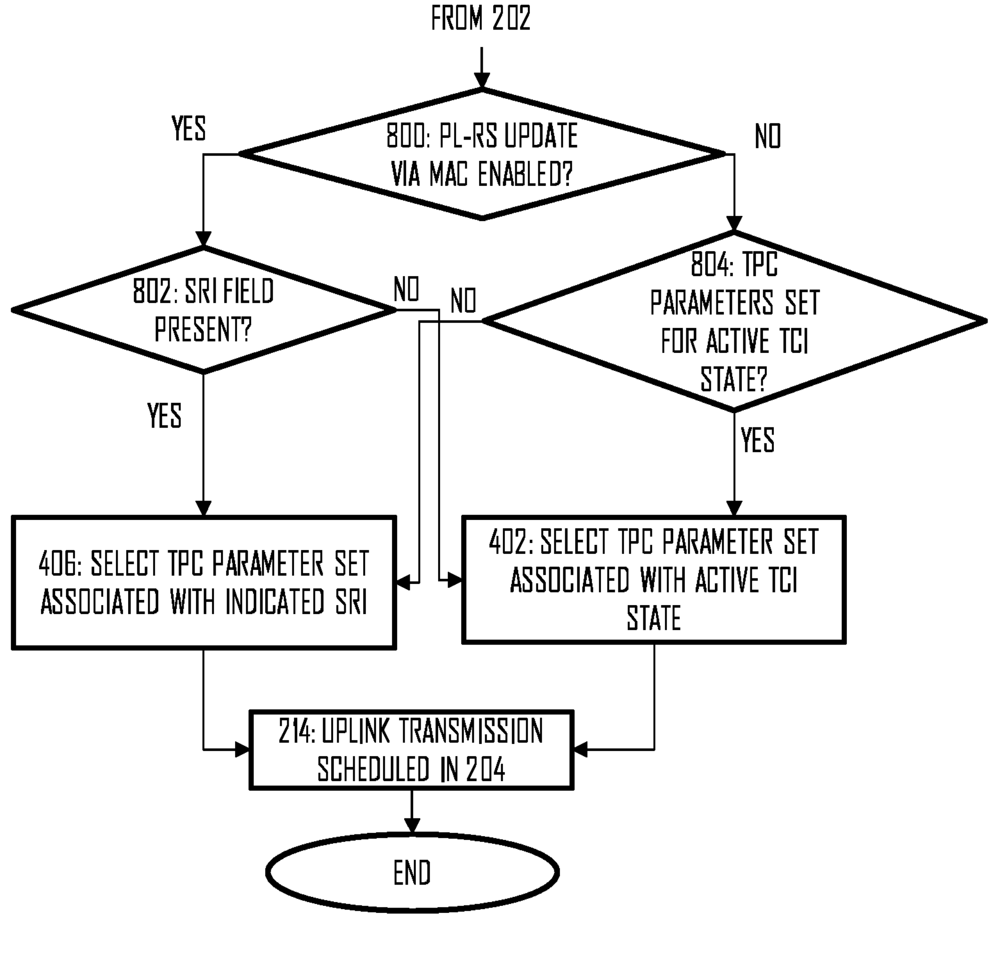
FIG. 8 illustrates another embodiment for selecting a transmit power control parameter set.

In the embodiments of FIGS. 4 to 7, the information element (one-bit or two-bit) is signalled by the access node in the DCI (or even MAC CE), for example. FIG. 8 illustrates an embodiment where the information element is signalled by the access node on a higher protocol layer, e.g. on the RRC layer. In the embodiment of FIG. 8, the information element indicates whether or not the MAC layer is enabled to update/reconfigure/modify the PL-RS (pathloss reference RS) configuration via a MAC control element (CE) for the SRI (or for SRS resource(s) in an SRS resource set(s), or even for TCI state(s)). The information element may indicate whether or not enablePL-RS-UpdateFor-PUSCH-SRS of the 3GPP specifications has been provided to the terminal device.

Referring to FIG. 8, the process may start after block 202. In block 800, the terminal device may determine whether or not the MAC is enabled to update the PL-RS configuration, i.e. depending on whether or not the enablePL-RS-Update-ForPUSCH-SRS is provided to the terminal device by the access node. If the terminal device determines in block 800 that the MAC is enabled to update the PL-RS configuration, the process proceeds to block 802 where the terminal device determines whether or not the SRI field is present in the DCI received in block 202. If the SRI field is present, the terminal device may use (block 406) the TPC parameter set (or at least the PL-RS) associated with (or mapped to) the indicated/applicable SRI. On the other hand, if no TPC parameter set has been associated with the SRI (SRI-PUSCH-PowerControl is not provided to the terminal device) and/or the SRI field is not present in the DCI, the terminal device may use (block 402) the TPC parameter set associated with (or included in) the indicated (active) uplink/joint TCI state (or current applicable uplink TCI state).

On the other hand, if the terminal device determines in block 800 that the MAC is not enabled to update the PL-RS configuration (enablePL-RS-UpdateForPUSCH-SRS is not provided to the terminal device), the process may proceed to block 804 where it is determined whether or not the TCI state activated in the DCI is associated with a TPC parameter set. If the active TCI state is associated with the TPC parameter set, the process proceeds to block 402 where the respective TPC parameter set is selected. The terminal device may thus use the TPC parameter set (or at least the PL-RS) associated with (or included in) the indicated (active) uplink/joint TCI state (or currently applicable uplink TCI state). If it is determined in block 804 that the active TCI state is associated with no TPC parameter set, the terminal device may carry out block 406. In other words, if the indicated (active) uplink/joint TCI state (or currently applicable uplink TCI state) is not associated to a TPC parameter set, the terminal device may use the TPC parameter set associated with (or mapped to) the indicated/applicable SRI (of the DCI).

In the embodiment of FIG. 8, the information element is comprised in a message of a radio resource control configuration, and the first value indicates that a medium access control layer is enabled to update a path loss reference signal configuration, and the second value indicates that the medium access control layer is disabled to update the path loss reference signal configuration.

Alternatively, or additionally, if the MAC is determined to be enabled in block 800 to update the PL-RS configuration (enablePL-RS-UpdateForPUSCH-SRS is provided to the terminal device), the terminal device may implement the selected TPC parameter set according to the following procedure. If the PL-RS of the indicated SRI is updated or received (at the terminal device) before the reception of an (updated/new) indicated active uplink/joint TCI state or before a HARQ-ACK reporting of an (updated/new) indicated active uplink/joint TCI state or before the applicability of an (updated/new) indicated active uplink/joint TCI state (or currently applicable uplink TCI state), the terminal device may use in the uplink transmission of block 214 the TPC parameter set associated with (or included in) this indicated active UL/joint TCI state (or current applicable (UL) TCI state). On the other hand, if the PL-RS of the indicated SRI has been updated or received (at the terminal device) after the reception or after the HARQ-ACK reporting or after the applicability of an (updated/new) indicated active uplink/joint TCI state (or currently applicable uplink TCI state), the terminal device may use in the uplink transmission of block 214 the TPC parameter set (or at least the PL-RS) associated with (or mapped to) the indicated/applicable SRI (of the received DCI).

Alternatively, or additionally, if the MAC is determined to be enabled in block 800 to update the PL-RS configuration (enablePL-RS-UpdateForPUSCH-SRS is provided to the terminal device), the terminal device may implement the selected TPC parameter set according to the following procedure. If the PL-RS of the indicated SRI (or of indicated SRS resource(s)) is updated or received (at the terminal device) within a predefined time period (e.g. X symbols or time slots) before or after the reception or before or after the HARQ-ACK reporting or before or after the applicability of an (updated/new) indicated active uplink/joint TCI state (or currently applicable uplink TCI state), the terminal device may use the TPC parameter set associated with (or included in) this indicated active uplink/joint TCI state (or currently applicable uplink TCI state). Otherwise, the terminal device may use the TPC parameter set (or at least the PL-RS) associated with (or mapped to) the indicated/applicable SRI (of the received DCI).

In yet another embodiment, if the PL-RS of the indicated SRI (or of indicated/triggered SRS resource(s) or SRS resource set) is updated or received (at the terminal device) within a predefined time period (e.g. X symbols or time slots) before or after the reception or before or after the HARQ-ACK reporting or before or after the applicability of an (updated/new) indicated active uplink/joint TCI state (or currently applicable uplink TCI state), the terminal device may use the TPC parameter set (or at least the PL-RS) associated with (or mapped to) the indicated/applicable SRI of the received DCI. Otherwise, the terminal device may use the TPC parameter set associated with (or included in) this indicated active uplink/joint TCI state (or currently applicable uplink TCI state).

Figure 9:
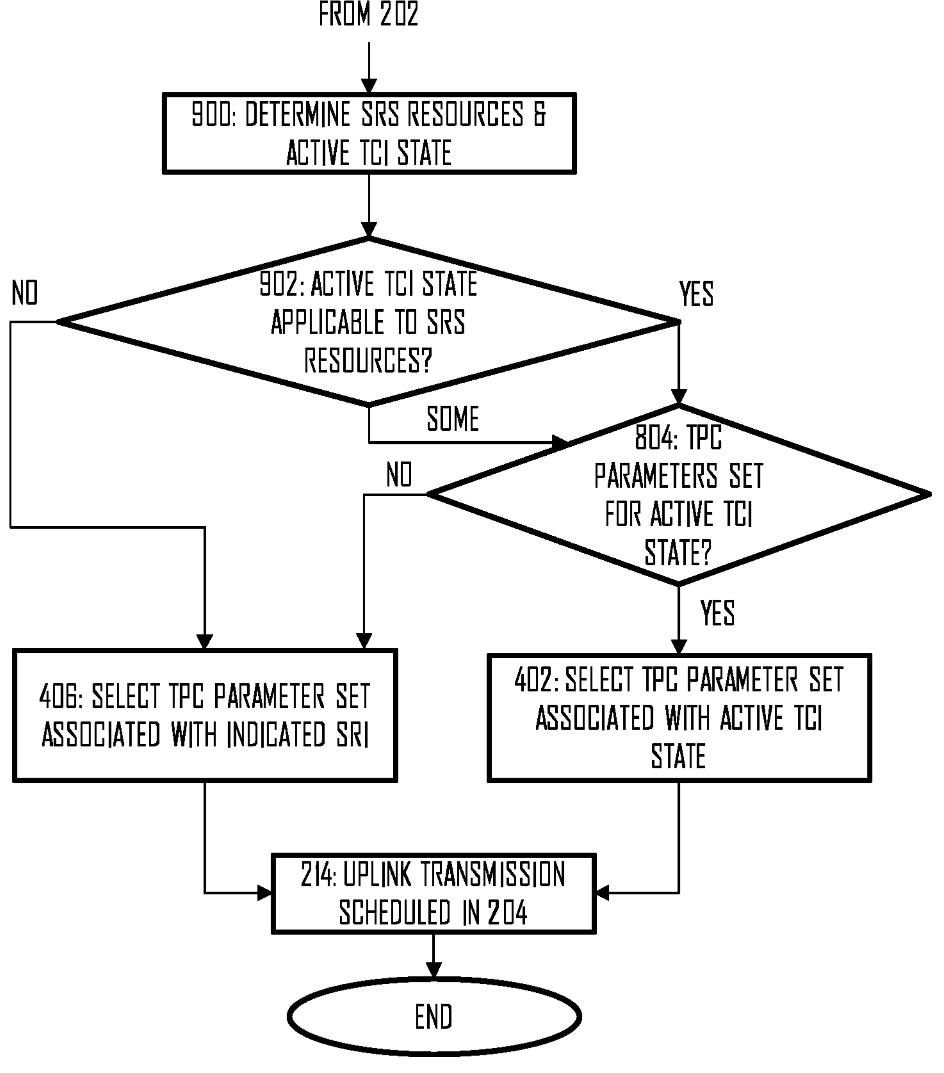
FIG. 9 illustrates a procedure for a terminal device to determine sounding reference signal resources and to select a transmit power control parameter set on the basis thereof.

FIG. 9 illustrates another embodiment for the terminal device for selecting the TPC parameter set amongst the multiple TPC parameter sets available for the uplink transmission. Referring to FIG. 9, the terminal device may determine the referred (uplink) SRS resource(s). If the SRI field is present, the terminal device may determine the SRS resource(s) from the SRI indication. Otherwise, there may be only one SRS resource (for codebook or non-codebook based PUSCH). The terminal device determines also the active TCI state from the received DCI (of the scheduling message of block 202 or from DCI of another message) and determines (block 902) whether or not the indicated active TCI state is applicable to the determined SRS resource(s). This may be determined from a higher layer (RRC) configuration, e.g. whether or not the determined SRS resource(s) have been configured for the active TCI state(s) in the higher layer configuration (e.g., this could be based on RRC where an SRS resource or corresponding SRS resource set is configured to share/not share the same indicated (active) TCI state(s) as dynamic-grant/configured-grant based PUSCH and all of dedicated PUCCH resources).

If it is determined in block 902 that the active TCI state is applicable to the determined SRS resource(s), the terminal device may carry out block 804, i.e. determine whether or not there is a TPC parameter set associated with the active TCI state. If there is, the terminal device may use the TPC parameter set (or at least some of these parameters) associated with (or include in) this active TCI state (block 402). If the active TCI state is not associated with (or doesn't include) a TPC parameter set, the terminal device may use the TPC parameter set (or at least some of these parameters) associated with the indicated/applicable SRI (block 406).

If it is determined in block 902 that the active TCI state is applicable to none of the determined SRS resource(s) (but e.g. still configured as a target signal of UL or, if applicable, joint TCI state), the terminal device may select the TPC parameter set (or at least some of these parameters) associated with the indicated/applicable SRI (block 406).

If it is determined in block 902 that the active TCI state is applicable to some (a subset) of the determined SRS resource(s), the terminal device may also proceed to block 804 and proceed as described above.

Alternatively, or additionally, for any of the above cases of FIG. 9, the terminal device may be explicitly signalled in the DCI and/or MAC CE (using new or existing field(s)/bits), whether to use the TPC parameter set (or at least some of these parameters) associated with (or included in) the active TCI state or the TPC parameter set associated with the indicated/applicable SRI. Such explicit signalling may overrule block 902 and cause direct execution of either block 402 or 406, depending on the value of the information element.

Above, embodiments have been described that provide the following advantages. When the unified TCI framework is configured for the terminal device in the above-described manner, the terminal device is able to support multiple TPC settings for the uplink transmission. This facilitates dynamic switching between the different transmission modes with dedicated TPC parameter sets, e.g. the eMBB and URLLC, also enabling optimization of power control parameters for different services. The presented embodiments enable the terminal device to determine which one of the configured TPC parameter sets to use at a given time. Any of the embodiments described above may alternatively (or additionally) be used for determining SRS power control parameter(s), essentially by replacing PUSCH by SRS. In other words, the uplink transmission above may refer to PUSCH transmission or to transmission of SRS.

Figure 10:
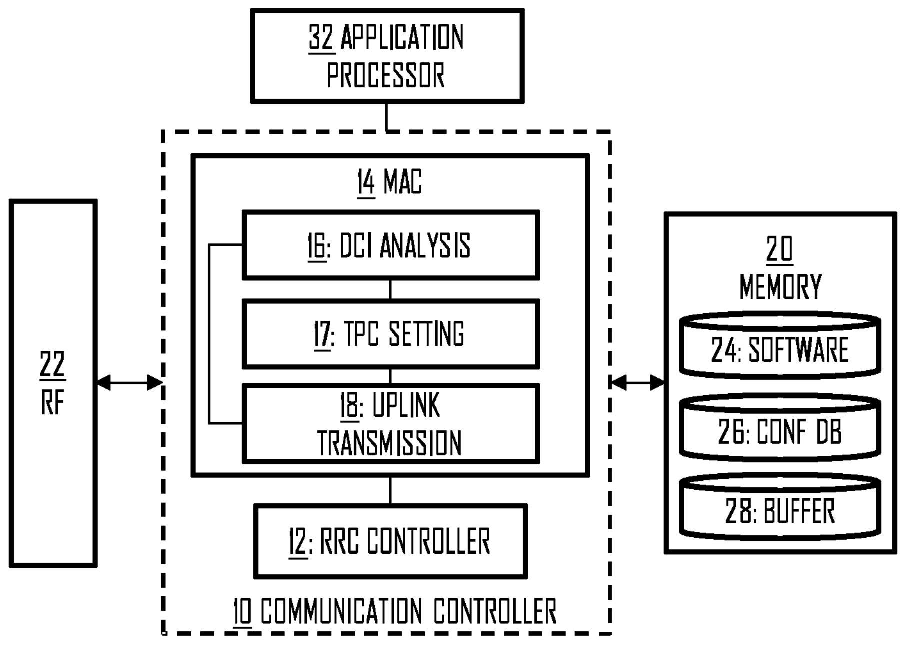
FIGS. 10 and 11 illustrate block diagrams of structures of apparatuses according to some embodiments.

FIG. 10 illustrates an apparatus comprising means for carrying out the process of FIG. 2 or any one of the embodiments described above. The apparatus may comprise a processing circuitry, such as at least one processor, and at least one memory 20 including a computer program code (software) 24, wherein the at least one memory and the computer program code (software) are configured, with the at least one processor, to cause the apparatus to carry out the process of FIG. 2 or any one of its embodiments described above. The apparatus may be for the terminal device 100. The apparatus may be a circuitry or an electronic device realizing some embodiments of the disclosure in the terminal device. The apparatus carrying out the above-described functionalities may thus be comprised in such a device, e.g. the apparatus may comprise a circuitry such as a chip, a chipset, a processor, a micro controller, or a combination of such circuitries for the terminal device. The at least one processor or a processing circuitry may realize a communication controller 10 controlling communications in a radio interface of the cellular communication system in the above-described manner. The communication controller may be configured to establish and manage radio connections, transfer of data over the radio (RRC) connections and transmit the reference symbol sequences generated according to any one of the embodiments described herein.

The communication controller 10 may comprise a radio resource control (RRC) controller 12 configured to establish, manage, and terminate radio connections between the access node(s) of the cellular communication system and the terminal device. The RRC controller 12 may be configured, for example, to establish and reconfigure the RRC connections in the terminal device. The RRC controller may, for example, configure the multiple TPC parameter sets for the terminal device, e.g. for different communication services the terminal device uses in communication with an access node over a RRC connection.

The communication controller 10 may further comprise a MAC entity 14 carry out MAC layer procedures in the terminal device. The MAC entity may comprise a DCI analysis circuitry 16 configured to analyse the contents of the DCI received in block 204, for example. The DCI analysis circuitry may, for example, determine the active TCI state(s) (i.e. current applicable (UL) TCI state) for the uplink transmission and/or the SRI potentially comprised in the received DCI. A TPC setting circuitry 17 may carry out blocks 208 to 212 or embodiments thereof and determine which one of the configured TPC parameter sets to apply to the uplink transmission scheduled by the DCI. The TPC parameter setting circuitry 17 may then determine the TPC parameters of the TPC parameter set and configure an uplink transmission circuitry to apply the respective TPC parameters (listed above) to the scheduled uplink transmission.

The apparatus may further comprise an application processor 32 executing one or more computer program applications that generate a need to transmit and/or receive data through the communication controller 30. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network and cause the need for executing the process of FIG. 2.

The memory 20 may be implemented using any suitable data storage technology, such as semiconductor-based memory devices, flash memory, magnetic memory devices and systems, optical memory devices and systems, fixed memory and removable memory. The memory 20 may comprise a configuration database 26 for storing configuration parameters, e.g. the configured TPC parameter sets and other RRC configurations described above.

The apparatus may further comprise a communication interface 22 comprising hardware and/or software for providing the apparatus with radio communication capability, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface.

Figure 11:
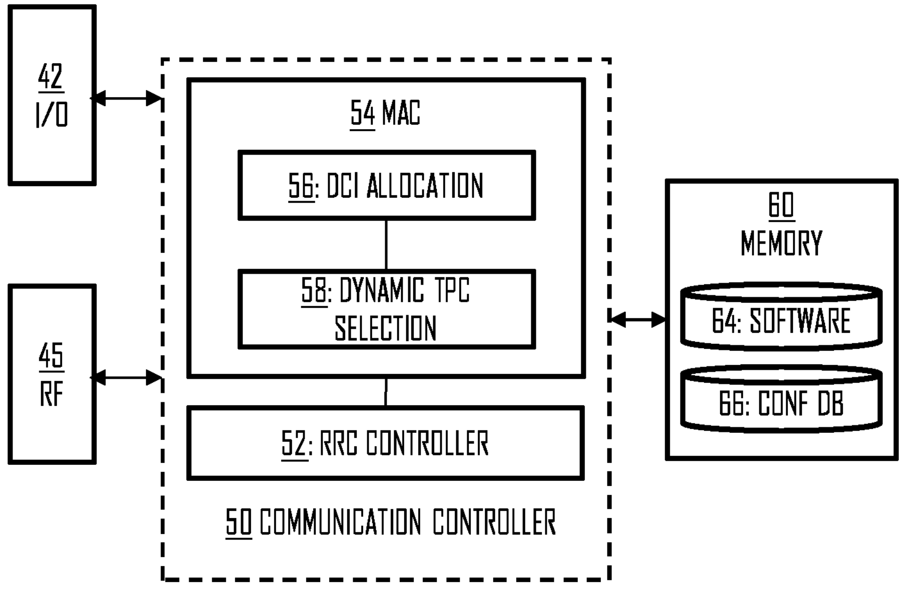

FIG. 11 illustrates an apparatus comprising a processing circuitry, such as at least one processor, and at least one memory 60 including a computer program code (software) 64, wherein the at least one memory and the computer program code (software) are configured, with the at least one processor, to cause the apparatus to carry out functions of the access node 104 in the process of FIG. 3 or any one of its embodiments described above. The apparatus may be for the access node. The apparatus may be a circuitry or an electronic device realizing some of the above-described embodiments in the access node. The apparatus carrying out the above-described functionalities may thus be comprised in such a device, e.g. the apparatus may comprise a circuitry such as a chip, a chipset, a processor, a micro controller, or a combination of such circuitries for the access node. In other embodiments, the apparatus is the access node. The at least one processor or a processing circuitry may realize a communication controller 50 controlling communications in the above-described manner. The communication controller may be configured to establish and manage radio connections and transfer of data over the radio connections.

The communication controller 50 may comprise an RRC controller 52 configured to establish, manage, and terminate radio connections with terminal devices served by the access node. The RRC controller 52 may be configured, for example, to establish and reconfigure the RRC connections with the terminal devices. The RRC controller 52 may, for example, configure the multiple TPC parameter sets for the terminal device, e.g. for different communication services the terminal device uses in communication with an access node over a RRC connection.

The communication controller 10 may further comprise a MAC entity 54 carry out MAC layer procedures in the access node. The MAC entity may, for example, carry out the dynamic selection of a TPC parameter sets amongst the TPC parameter sets configured on the RRC layer. The communication controller may further comprise a scheduler (not shown) configured to schedule uplink transmission resources to the terminal device. A DCI allocation circuitry 56 may generate the DCI that indicates the scheduled uplink transmission resources to the terminal device and, additionally, may indicate the active TCI state(s) for the uplink transmission. The MAC entity 54 may further comprise a dynamic TPC parameter set selection circuitry 58 configured to select the TPC parameter set amongst the multiple configured TPC parameter sets and, consequently, to select the value for the information element in the embodiments of FIGS. 4 to 7.

The communication controller 50 may further comprise a transmission signal processing circuitry 54 configured to generate and transmit signals over the radio interface to the terminal device, e.g. the DCI.

The memory 60 may be implemented using any suitable data storage technology, such as semiconductor-based memory devices, flash memory, magnetic memory devices and systems, optical memory devices and systems, fixed memory and removable memory. The memory 60 may comprise a configuration database 66 for storing configuration parameters, e.g. the RRC configuration of the terminal device (and RRC configurations of other terminal devices), and the TPC parameter sets configured to the terminal device, e.g. for the different communication services provided to the terminal device.

The apparatus may further comprise a radio frequency communication interface 45 comprising hardware and/or software for providing the apparatus with radio communication capability with the terminal devices, as described above. The communication interface 45 may include, for example, an antenna array, one or more radio frequency filters, a power amplifier, and one or more frequency converters. The communication interface 45 may comprise hardware and software needed for realizing the radio communications over the radio interface, e.g. according to specifications of an LTE or 5G radio interface.

The apparatus may further comprise another communication interface 42 for communicating towards the core network. The communication interface may support respective communication protocols of the cellular communication system to enable communication with other access nodes, with other nodes of the radio access network, and with nodes in the core network and even beyond the core network. The communication interface 42 may comprise necessary hardware and software for such communications.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the disclosure.

The processes or methods described in FIG. 2, 3, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

LIST OF ABBREVIATIONS

DCI Downlink control information
PDCCH Physical downlink control channel
RRC Radio resource control
TCI Transmission configuration indicator
TPC Transmit power control
UE User equipment
PUSCH Physical uplink shared channel
RS Reference signal
SRS Sounding reference signal
SRI SRS resource indicator
TPMI Transmit precoding matrix indicator
eMBB Enhanced mobile broadband
URLLC Ultra-reliable low-latency communication
MAC Medium access control
HARQ Hybrid automatic repeat request
ACK Acknowledgment
UL Uplink
DL Downlink

The invention claimed is:

1. An apparatus, comprising:
at least one processor; and
at least one memory storing instructions that, when executed by the at least one processor, cause the apparatus to perform:
store, based on a radio resource control configuration received from an access node, exactly two transmit power control parameter sets for physical uplink shared channel (PUSCH) transmissions, wherein:
each transmit power control parameter set comprises at least a target reception power parameter p0 and a pathloss compensation factor α,
both transmit power control parameter sets are statically bound, in the radio resource control configuration, to a same single uplink transmission configuration indicator (TCI) state, and
no other transmit power control parameter set is associated with the same uplink TCI state;
receive, from the access node, a single downlink control information (DCI) message that:
schedules exactly one PUSCH transmission,
activates the same single uplink TCI state for the scheduled PUSCH transmission, and
includes a one-bit transmit power control parameter set indicator field carried in the DCI scheduling the PUSCH transmission;
select, at a medium access control layer of the apparatus and prior to transmission of the scheduled PUSCH, one and only one of the two transmit power control parameter sets solely based on the value of the one-bit indicator field, wherein:
a first value of the one-bit indicator field selects a first one of the two transmit power control parameter sets associated with the uplink TCI state, and
a second value of the one-bit indicator field selects a second one of the two transmit power control parameter sets associated with the uplink TCI state;
determine uplink transmit power for the scheduled PUSCH transmission using only the p0 and α parameters of the selected transmit power control parameter set, without reference to:
any sounding reference signal resource indicator (SRI),
any transmit power control command conveyed outside the DCI scheduling the PUSCH transmission,
any medium access control (MAC) control element modifying a pathloss reference signal, or
any transmit power control parameter set configured for a different TCI state; and transmit the scheduled PUSCH transmission using the determined uplink transmit power.

2. The apparatus of claim 1, wherein the first transmit power control parameter set and the second transmit power control parameter set are distinguished by respective fixed indices, and wherein the one-bit indicator field selects between the two transmit power control parameter sets based on the indices.

3. The apparatus of claim 2, wherein the first transmit power control parameter set is configured for enhanced mobile broadband service and the second transmit power control parameter set is configured for ultra-reliable low-latency communication service.

4. The apparatus of claim 3, wherein determining the uplink transmit power comprises applying only open-loop power control parameters of the selected transmit power control parameter set and excludes applying any closed-loop power control adjustment.

5. The apparatus of claim 4, wherein both transmit power control parameter sets share a same closed-loop power control index and differ only in a one open-loop parameter.

6. The apparatus of claim 5, wherein the first transmit power control parameter set differs from the second transmit power control parameter set only in a target reception power parameter p0.

7. The apparatus of claim 6, wherein the selection of the transmit power control parameter set is performed after reception of the DCI scheduling the PUSCH transmission and before transmission of a hybrid automatic repeat request acknowledgment associated with the DCI.

8. The apparatus of claim 7, wherein the association of the two transmit power control parameter sets with the uplink TCI state remains unchanged during the scheduled PUSCH transmission.

9. The apparatus of claim 8, wherein the selection of the transmit power control parameter set is performed exclusively at a medium access control layer of the apparatus and is not modified by radio resource control signaling after reception of the DCI.

10. The apparatus of claim 9, wherein the scheduled PUSCH transmission is associated with only one serving cell and only the single uplink TCI state.

11. A method performed by an apparatus, the method comprising:

storing, based on a radio resource control configuration received from an access node, exactly two transmit power control parameter sets for physical uplink shared channel (PUSCH) transmissions, wherein:

each transmit power control parameter set comprises at least a target reception power parameter p0 and a pathloss compensation factor α, both transmit power control parameter sets are statically bound, in the radio resource control configuration, to a same single uplink transmission configuration indicator (TCI) state, and no other transmit power control parameter set is associated with the same uplink TCI state;

receiving, from the access node, a single downlink control information (DCI) message that:

schedules exactly one PUSCH transmission, activates the same single uplink TCI state for the scheduled PUSCH transmission, and includes a one-bit transmit power control parameter set indicator field carried in the DCI scheduling the PUSCH transmission;

selecting, at a medium access control layer of the apparatus and prior to transmission of the scheduled PUSCH, one and only one of the two transmit power control parameter sets solely based on the value of the one-bit indicator field, wherein:

a first value of the one-bit indicator field selects a first one of the two transmit power control parameter sets associated with the uplink TCI state, and a second value of the one-bit indicator field selects a second one of the two transmit power control parameter sets associated with the uplink TCI state;

determining uplink transmit power for the scheduled PUSCH transmission using only the p0 and α parameters of the selected transmit power control parameter set, without reference to:

any sounding reference signal resource indicator (SRI), any transmit power control command conveyed outside the DCI scheduling the PUSCH transmission, any medium access control (MAC) control element modifying a pathloss reference signal, or any transmit power control parameter set configured for a different TCI state; and transmitting the scheduled PUSCH transmission using the determined uplink transmit power.

12. The method of claim 11, wherein the first transmit power control parameter set and the second transmit power control parameter set are distinguished by respective fixed indices, and wherein the one-bit indicator field selects between the two transmit power control parameter sets based on the indices.

13. The method of claim 12, wherein the first transmit power control parameter set is configured for enhanced mobile broadband service and the second transmit power control parameter set is configured for ultra-reliable low-latency communication service.

14. The method of claim 13, wherein determining the uplink transmit power comprises applying only open-loop power control parameters of the selected transmit power control parameter set and excludes applying any closed-loop power control adjustment.

15. The method of claim 14, wherein both transmit power control parameter sets share a same closed-loop power control index and differ only in a one open-loop parameter.

16. The method of claim 15, wherein the first transmit power control parameter set differs from the second transmit power control parameter set only in a target reception power parameter p0.

17. The method of claim 16, wherein the selection of the transmit power control parameter set is performed after reception of the DCI scheduling the PUSCH transmission and before transmission of a hybrid automatic repeat request acknowledgment associated with the DCI.

18. The method of claim 17, wherein the association of the two transmit power control parameter sets with the uplink TCI state remains unchanged during the scheduled PUSCH transmission.

19. The method of claim 18, wherein the selection of the transmit power control parameter set is performed exclusively at a medium access control layer of the apparatus and is not modified by radio resource control signaling after reception of the DCI.

20. The method of claim 19, wherein the scheduled PUSCH transmission is associated with only one serving cell and only the single uplink TCI state.

* * * * *